(12) United States Patent
Zinda et al.

(10) Patent No.: US 7,634,806 B2
(45) Date of Patent: Dec. 15, 2009

(54) PEER ASSEMBLY INSPECTION

(75) Inventors: Eric K. Zinda, Seattle, WA (US); Erik B. Olson, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 726 days.

(21) Appl. No.: 10/157,118

(22) Filed: May 30, 2002

(65) Prior Publication Data
US 2003/0226033 A1   Dec. 4, 2003

(51) Int. Cl.
G06F 11/00 (2006.01)
H04L 29/06 (2006.01)
G06F 12/00 (2006.01)

(52) U.S. Cl. .................. 726/22; 713/164; 707/100
(58) Field of Classification Search .............. 726/23, 726/22; 713/164; 707/100
See application file for complete search history.

(56) References Cited

U.S. PATENT DOCUMENTS

| | | | | |
|---|---|---|---|---|
| 4,531,023 | A * | 7/1985 | Levine | 379/93.02 |
| 5,832,208 | A * | 11/1998 | Chen et al. | 726/24 |
| 5,832,514 | A | 11/1998 | Norin et al. | |
| 5,960,170 | A * | 9/1999 | Chen et al. | 714/38 |
| 5,974,549 | A * | 10/1999 | Golan | 726/23 |
| 6,006,328 | A * | 12/1999 | Drake | 726/23 |
| 6,009,456 | A | 12/1999 | Frew et al. | |
| 6,016,393 | A | 1/2000 | White et al. | |
| 6,055,562 | A | 4/2000 | Devarakonda et al. | |
| 6,065,039 | A | 5/2000 | Paciorek | |
| 6,065,040 | A | 5/2000 | Mima et al. | |
| 6,115,736 | A | 9/2000 | Devarakonda et al. | |
| 6,134,580 | A | 10/2000 | Tahara et al. | |
| 6,163,855 | A | 12/2000 | Shrivastava et al. | |
| 6,192,354 | B1 | 2/2001 | Bigus et al. | |
| 6,233,601 | B1 | 5/2001 | Walsh | |
| 6,282,546 | B1 * | 8/2001 | Gleichauf et al. | 707/102 |
| 6,282,563 | B1 | 8/2001 | Yamamoto et al. | |
| 6,282,582 | B1 | 8/2001 | Oshima et al. | |
| 6,330,588 | B1 | 12/2001 | Freeman | |
| 6,334,146 | B1 | 12/2001 | Parasnis et al. | |
| 6,505,228 | B1 * | 1/2003 | Schoening et al. | 718/106 |
| 6,530,024 | B1 * | 3/2003 | Proctor | 726/23 |

(Continued)

OTHER PUBLICATIONS

A secure platform for peer-to-peer computing in the Internet. Wooyoung Kim; Graupner, S.; Sahai, A.; System Sciences, 2002. HICSS. Proceedings of the 35th Annual Hawaii International Conference on Jan. 7-10, 2002 pp. 3948-3957.*

(Continued)

*Primary Examiner*—Techane J Gergiso
(74) *Attorney, Agent, or Firm*—Workman Nydegger

(57) ABSTRACT

A method and system for preventing undesired behaviors by executable code modules in a peer-to-peer computer system are provided. When a code module is received, an assembly inspection module queries a blacklist for the received code module. When the received code module is found on the blacklist, the computer system prevents execution of the received code module. Each peer includes an assembly inspection module. When the received code module is not found on the blacklist, the assembly inspection module inspects the received executable code module, prior to execution, to determine whether the code module can perform any undesired behaviors. If so, the received code module is added to the blacklist and prevented from executing.

38 Claims, 6 Drawing Sheets

U.S. PATENT DOCUMENTS

| | | | | |
|---|---|---|---|---|
| 6,532,543 | B1* | 3/2003 | Smith et al. | 726/14 |
| 6,775,657 | B1* | 8/2004 | Baker | 706/45 |
| 6,792,462 | B2* | 9/2004 | Bernhardt et al. | 709/225 |
| 6,826,698 | B1* | 11/2004 | Minkin et al. | 726/1 |
| 7,165,239 | B2* | 1/2007 | Hejlsberg et al. | 717/114 |
| 2001/0034771 | A1* | 10/2001 | Hutsch et al. | 709/219 |
| 2003/0023873 | A1* | 1/2003 | Ben-Itzhak | 713/201 |
| 2003/0084323 | A1* | 5/2003 | Gales | 713/200 |
| 2003/0172196 | A1* | 9/2003 | Hejlsberg et al. | 709/328 |
| 2004/0205772 | A1* | 10/2004 | Uszok et al. | 719/317 |

OTHER PUBLICATIONS

Brian et al (.NET Framework Security Created on 2001 and Published on May 7, 2002 by Addison-Wesley, ISBN:0-672-32184-X; pp. 1-793).*

Brian et al (.NET Framework Security Created on 2001 and Published on May 7, 2002 by Addison-Wesley, ISBN:0-672-32184-X).*

United Devices, Inc.™, printed from http://www.ud.com/home.htm, Apr. 24, 2002, 1 page.

Products: MetaProcessor™ platform version 2.1, printed from http://www.ud.com/products/mp_platform.htm, Apr. 24, 2002, 2 pages.

Projects: Cancer Research , printed from http://members.ud.com/projects/cancer/, Apr. 24, 2002, 1 page.

Grid computing -printed from http://searchwebservices.techtarget.com/sDefinition/0,,sid26_gci773157,00.html, May 21, 2002, 3 pages.

B. Rostamzadeh et al., "DACAPO: A Distributed Computer Architecture for Safety-Critical Control Applications", Intelligent Vehicles '95 Symposium, Sep. 25-26, 1995, pp. 376-381.

J. Gosling, "The Feel of Java", IEEE Computer Society, Jun. 1997, pp. 53-57.

K. Minato et al., "Multipath Allocation Control in Communication Network Using Cooperative Distributed Multi-Agent Model", Denishi Joho Tsushin Gakkai, Nov. 1991, vol. J 74 B-1, No. 11, pp. 909-918.

L. Goldschlager, "A Universal Interconnection Pattern for Parallel Computers", Journal of the Association for Computing Machinery, vol. 29, No. 3, Jul. 1982, pp. 1073-1086.

E. Krieger et al., *Models@Home: distributed computing in bioinformatics using a screensaver based approach*, Oxford University Press, Feb. 2002, vol. 18, No. 2, pp. 315-318.

D. Liang et al., "A fault-tolerant object service on CORBA", The Journal of Systems and Software, vol. 48, No. 3, Nov. 1999, pp. 197-211.

W. Reisig, "Distributed Algorithms: Modeling and Analysis with Petri Nets", IEEE International Conference on Systems, Man, And Cybernetics, vol. 1, 1998, pp. 38-43.

T. Mudge, "A Computer Architecture For Parallel Processing", University of Michigan, p. 596.

M. Portmann et al., "The Cost of Peer Discovery and Searching in the Gnutella Peer-to-peer File Sharing Protocol", IEEE, 2001, pp. 263-268.

N. Eng et al., "An Initial Approach of a Scalable Multicast-based Pure Peer-to-Peer System", IEEE Proceedings of the First International Conference on Peer-to-Peer Computing, Aug. 27, 2001, pp. 97-98.

A. Loo et al., "A peer-to-peer distributed selection algorithm for the Internet", Internet Research: Electronic Networking Applications and Policy, vol. 12, No. 1, 2002, pp. 16-30.

C. J. Anumba et al., "Collaborative design of structures using intelligent agents", Automation in Construction, 2002, pp. 89-103.

B. Boutsinas et al., "On distributing the clustering process", Pattern Recognition Letters, vol. 23, No. 8, 2002, pp. 999-1008.

* cited by examiner

PEER ASSEMBLY INSPECTION

FIELD OF THE INVENTION

The invention generally relates to distributed computing architectures. More specifically, the invention relates to preventing executable software received from a potentially untrusted source from performing undesirable or malicious behavior in the receiving computer system.

BACKGROUND OF THE INVENTION

Distributed computing systems are generally known in the art. However, known distributed computing systems such as grid computing systems typically divide a single large computing task into sub-tasks, and each participant in the grid computing system performs or solves only the sub-task that it was given. In addition, each distributed computer generally only works on its assigned sub-task when its processor or other resources necessary to the sub-task would otherwise be idle. In addition, each distributed computer node is required to trust a central authority to execute code on the node's machine with little control over what that code is able to do.

For example, one known distributed computing system is the Intel-United Devices Cancer Research Project sponsored by United Devices, Inc. of Austin, Tex. and Intel Corporation of Santa Clara, Calif. The Cancer Research Project allows PC owners to volunteer idle processor time on their own computers to help find a cure for cancer. Each user downloads a software client that periodically receives a research sub-task from a server, and performs the sub-task when the local computer processor would otherwise be idle. Upon completion of the sub-task, the local client sends the results to the server, and receives a new sub-task. At all times the local client is dependent on the central server that divides the task into sub-tasks and assigns sub-tasks to volunteer client machines. In addition, each client does not contribute to the computing space except that the client performs an assigned sub-task. That is, each client only executes sub-tasks defined by the server; each client is not capable of executing any arbitrary application program introduced by an arbitrary node. Finally, the nodes must rely on United Devices to ensure that code or data coming from the server will execute in a manner that will not harm other components of the machine, such as by deleting or altering data on the hard drive. This known system is bounded by the ability of the central server to assign sub-tasks to each of the nodes for processing.

Another known pseudo-distributed computing space is demonstrated by online roll-playing games such as Ultima Online®. In an online roll-playing game (RPG), each remote user typically must log in to a central server that administers and oversees the game play of the RPG. The virtual world in which characters live is defined by and maintained by the central server, and appears identical to each remote client (player characters) connected to that central server. In addition, all interaction between players goes through the central server. Thus, while online RPGs may be thought of as distributed computing environments, they are in fact large client-server applications, and users are not allowed to introduce executable elements into the system.

Thus, it would be an advancement in the art to provide a computing space in which programs could run on any computer without being dependent on a central server, and in which each computer is part of and defines the overall computing space. It would be a further advancement in the art if the computing space were unbounded such that the computing space is potentially defined by an unlimited number of participating computers.

It would also be an advancement in the art to provide a system that allows any user or system (trusted or untrusted) to introduce executable code that can be run on any peer node, while providing a guarantee that the code will not perform undesired behaviors (e.g., attacking the host computer system or using excessive system resources).

BRIEF SUMMARY OF THE INVENTION

The present invention overcomes the problems and limitations of the prior art by providing for the scanning of received software prior to its running on a computer system. That is, prior to executing a received executable program, a computer system scans the program for an indication that the program could cause an undesired behavior if it were executed on the computer system.

When a program is received by a computer system, whether through introduction by a user or from a peer computer system, the computer system queries a database of blacklisted programs. If the received program is found in the blacklist database, the computer system does not allow the received program to run. If the received program is not found in the blacklist database, the computer system scans the received program to determine whether the received program might cause an undesired behavior if it were to run on the computer system. If the computer system determines that the received program could cause an undesired behavior, the computer system adds the received program to the blacklist database and does not allow the received program to run on the computer system. Alternatively, the computer system may scan each received program each time it is received, without checking any blacklist database.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

Aspects of the present invention provide an unbounded computing space in which agent programs can execute. One or more aspects of the invention are applicable to any general purpose computing platform capable of running a variety of operating systems, virtual machines, and applications, including PCs running WINDOWS®, LINUX®, MacOS®, or SOLARIS® brand operating systems and the like, as well as PDA devices, Tablet PCs, pen-based computers, and other data processing systems.

Figure 1:
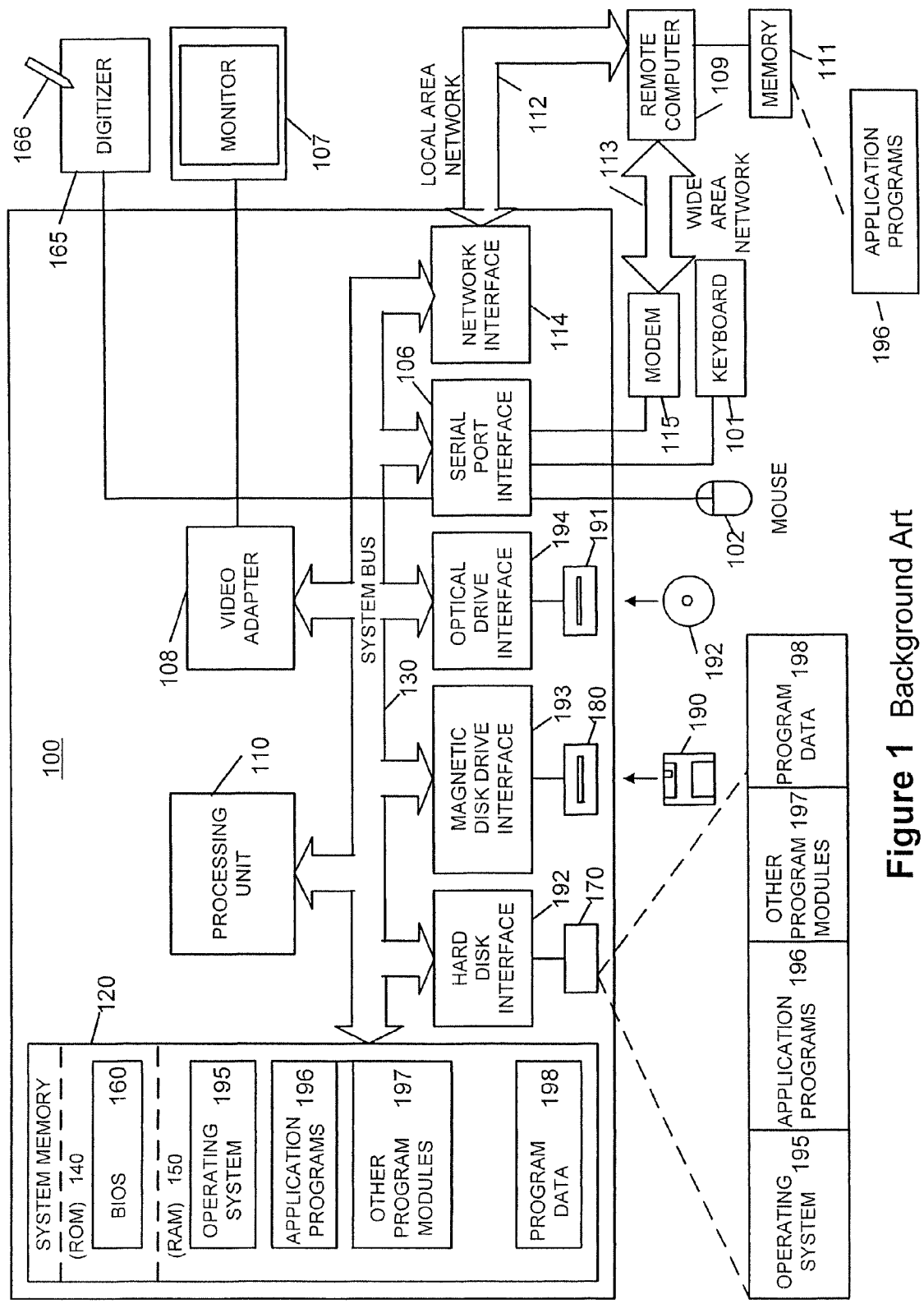
FIG. 1 illustrates a schematic diagram of an exemplary general-purpose digital computing environment that may be used to implement various aspects of the present invention.

FIG. 1 illustrates a schematic diagram of an exemplary conventional general-purpose digital computing environment that may be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules, and other data for the personal computer 100. It will be appreciated by those skilled in the art that other types of computer readable media that may store data that is accessible by a computer, such as magnetic cassettes, flash memory cards, digital video disks, Bernoulli cartridges, random access memories (RAMs), read only memories (ROMs), and the like, may also be used in the example operating environment. It will also be appreciated that one or more aspects of the invention may be implemented using software, hardware, or a combination of the two.

A number of program modules may be stored on the hard disk drive 170, magnetic disk 190, optical disk 192, ROM 140, or RAM 150, including an operating system 195, one or more application programs 196, other program modules 197, and program data 198. A user may enter commands and information into the computer 100 through input devices, such as a keyboard 101 and a pointing device 102. Other input devices (not shown) may include a microphone, joystick, game pad, satellite dish, scanner, or the like. These and other input devices often are connected to the processing unit 110 through a serial port interface 106 that is coupled to the system bus 130, but may be connected by other interfaces, such as a parallel port, game port, or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor 107, personal computers typically include other peripheral output devices (not shown), such as speakers and printers. As one example, a pen digitizer 165 and accompanying pen or user input device 166 are provided in order to digitally capture freehand input. The pen digitizer 165 may be coupled to the processing unit 110 via the serial port interface 106 and the system bus 130, as shown in FIG. 1, or through any other suitable connection. Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 may operate in a networked environment using logical connections to one or more remote computers, such as a remote computer 109. The remote computer 109 may be a server, a router, a network PC, a peer device, or other common network node, and typically includes many or all of the elements described above relative to the computer 100, although only a memory storage device 111 with related applications programs 196 have been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet.

When used in a LAN networking environment, the computer 100 is connected to the local network 112 through a network interface or adapter 114. When used in a WAN networking environment, the personal computer 100 typically includes a modem 115 or other means for establishing a communications link over the wide area network 113, e.g., to the Internet. The modem 115, which may be internal or external, is connected to the system bus 130 via the serial port interface 106. In a networked environment, program modules depicted relative to the personal computer 100, or portions thereof, may be stored in a remote memory storage device.

It will be appreciated that the network connections shown are exemplary and other techniques for establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Figure 2:
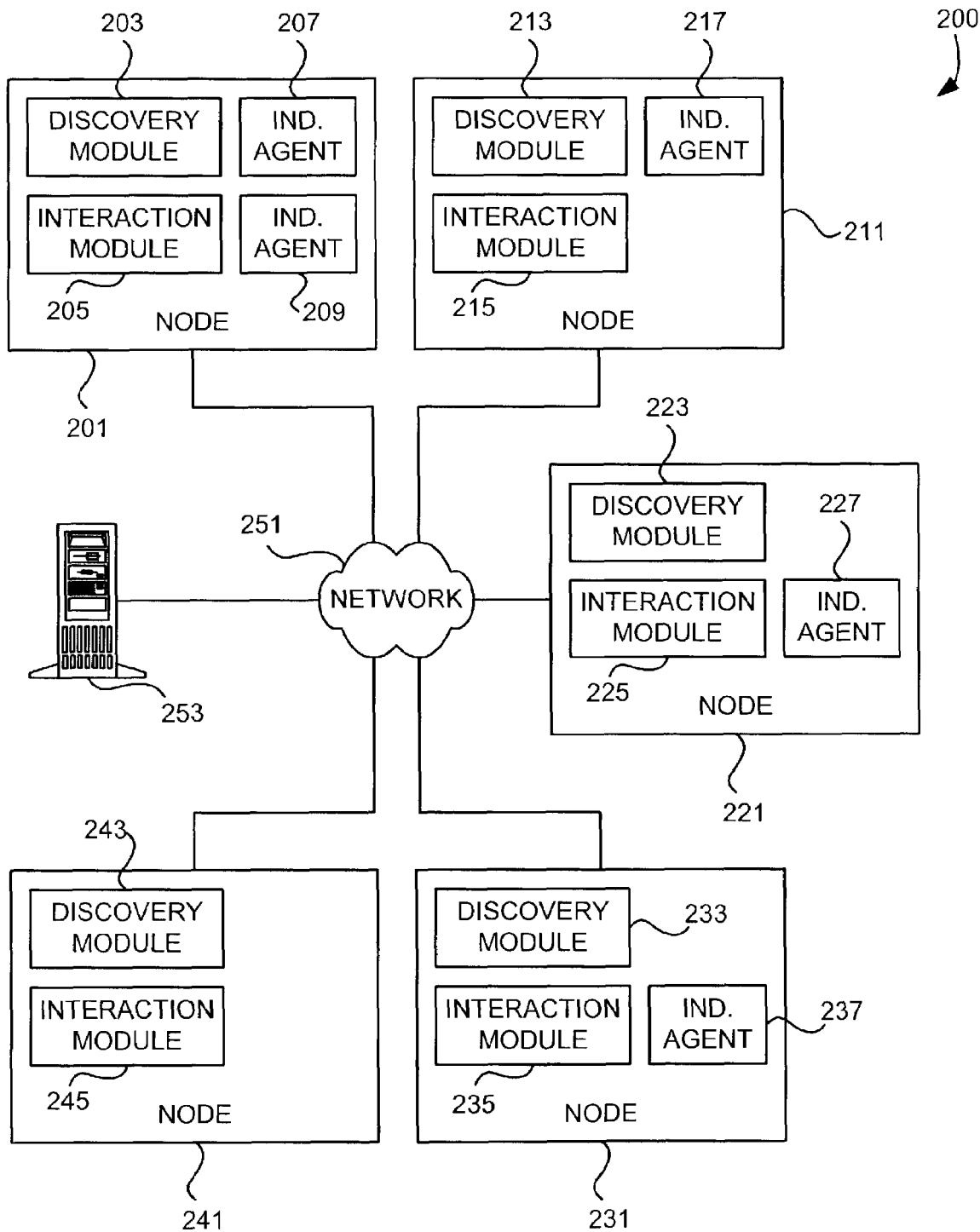
FIG. 2 illustrates a schematic diagram of a network of independent processing nodes communicating via a network according to an illustrative embodiment of the invention.

With reference to FIG. 2, a symmetric multi-processing unbounded computing space can be created by leveraging idle processing time on networked computers, combined with sufficient security and sandbox mechanisms to allow execution of code from potentially untrusted sources. Each node in the computing space may have a detection mechanism to discover other nodes in the computing space. As a result, new nodes may by dynamically added and removed without being required to register with a central server, and any user can introduce executable code into the computing space.

An unbounded computing space (UCS) 200 includes one or more independent nodes 201, 211, 221, 231, 241. Each node that is a part of the UCS 200 provides an environment in which software programs, referred to as independent agents, can run. That is, each node acts as an execution shell for independent agents. In addition, because each node added to UCS 200 may have a different configuration from the other nodes (e.g., varying software, resources, security policy, hardware, attached peripheral devices, etc.), each node provides a unique computing space. Thus, two different nodes executing the same independent agent may yield different results.

Each node in the unbounded computing space may be thought of similar to a plot of land, with unique characteristics, that executes independent agents received from other nodes within the UCS. Thus, as each node is added to the UCS 200, e.g., by launching node application software, the environment in which independent agents can run increases. Likewise, as nodes are removed from the UCS 200 (e.g., as a result of a user closing the node application program executing on a computer system), the environment in which independent agents can run decreases.

The individual nodes that make up the unbounded computing space might not be dependent on a server for the receipt of independent agent software modules. That is, each node in the unbounded computing space can introduce an independent agent, which may subsequently be copied or transferred to another node within the unbounded computing space.

A node 201 in unbounded computing space 200 includes a discovery module 203 and interaction module 205, and often (but not always) includes one or more independent agents 207, 209. Node 201 calls discovery module 203 to detect other nodes within the unbounded computing space, and calls interaction module 205 to interact with the other detected nodes, e.g., by sending an independent agent to another node. As stated above, independent agent 207, 209 is a code assembly that uses the interaction module to travel to and execute on another node or nodes within the unbounded computing space to perform a function. Independent agents can be transported or copied from one node to another, optionally maintaining state information between nodes. It is also possible that an agent does not travel from one node to another, and instead executes only in the node in which it was introduced.

Unbounded computing space 200 may also include additional nodes 211, 221, 231, 241, with respective discovery modules 213, 223, 233, 243, interaction modules 215, 225, 235, 245, and independent agents 217, 227, 237. Nodes, generally, are embodied in computer systems interconnected via a network 251 such as the Internet, a LAN, WAN, intranet, etc. Each node may vary in composition from system to system, provided each node can understand the other nodes within the unbounded computing space, e.g., by using a common communication protocol. That is, each node can use a unique algorithm to create and define a computing space that is represented by the node.

Figure 3:
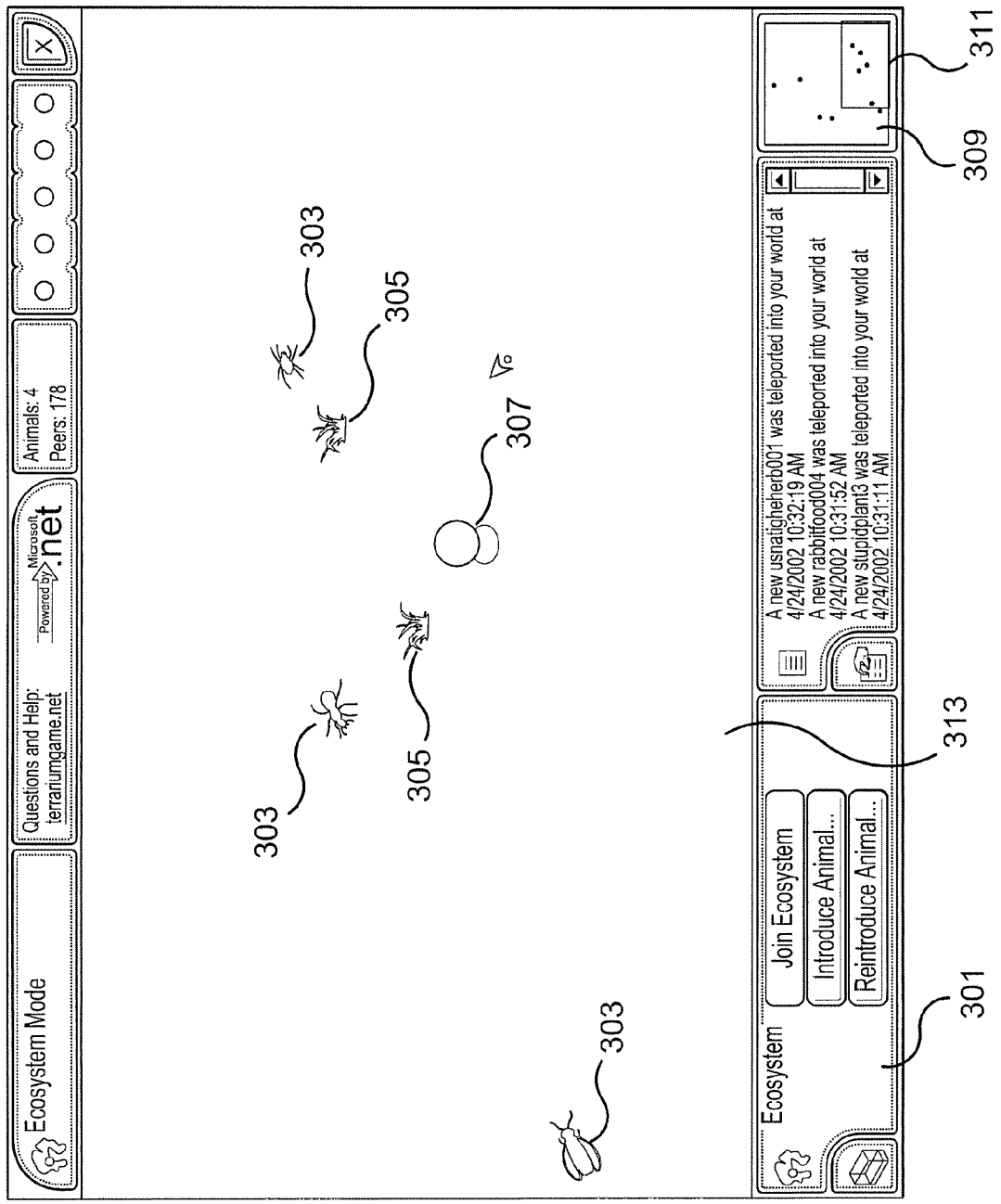
FIG. 3 illustrates a screenshot of a user interface for an independently processing peer used as an unbounded gaming application according to an illustrative embodiment of the invention.

In one illustrative example, with reference to FIG. 3, nodes may represent physical terrain in a virtual world. FIG. 3 illustrates a user interface for a terrain node 301 that is part of an unbounded computing space that interacts to play a game. Each independent agent 303, 305 may represent an animal or plant that lives and grows (and potentially dies) on the terrain in the virtual world, and that may be transported from one terrain node to another terrain node. Another independent agent 307 might execute only on the terrain node on which it is initially introduced and launched. In this example, independent agent 307 represents a sphere that randomly travels around the terrain of its local terrain node and, upon hitting an independent agent representing an animal or plant, causes the local terrain node to "teleport" the animal or plant to another random terrain node within the unbounded computing space by copying the independent agent to another terrain node along with the current state information of the independent agent. FIG. 3 illustrates only a portion of the terrain of the terrain node 301. Map 309 illustrates the entire terrain located on terrain node 301, and box 311 indicates the visible portion shown in window 313.

In another example, each node may be defined to allow diagnostic functions to execute on the computer system on which each node is located. That is, an independent agent may perform a diagnostic service on the computer system on which the node is located. For example, an independent agent named Defragger, upon being introduced on or copied to a diagnostic node, may check to determine a fragmentation level of one or more local hard drives. When the fragmentation level is above a predefined threshold, Defragger may launch a defragmentation utility on the local computer to defragment the identified hard drive. Similarly, an independent agent named SpaceMaker, upon being introduced on or copied to a diagnostic node, may check to determine how much space is available on the local hard drives of the computer on which the diagnostic node is located. When the amount of available space is below a predefined amount (or percentage of total space available), SpaceMaker may automatically (optionally upon confirmation by a user) delete files known not to be needed, such as temporary files, cache files, and the like.

As is illustrated above, because each node can use a different algorithm, each node can serve a different purpose than other nodes, and can allow different tasks than other nodes allow. In one illustrative embodiment, nodes of differing types communicate with each other in a global unbounded computing space, e.g., through the use of a common port on each computer system. Before sending an independent agent from one node to another, the nodes may communicate to determine whether the independent agent is compatible with the node to which it is being sent (e.g., an independent agent of the animal type illustrated above cannot successfully run on a diagnostic node). When a node of one type sends an agent meant for execution on a node of a second type, the receiving node may still execute the agent in order to read parameter information associated with the agent. Upon detecting that the agent is meant for another type of node, the receiving node may stop execution of the agent.

In an alternative illustrative embodiment, unbounded computing spaces of different types are kept separate, and nodes of one type are unaware of and do not communicate with nodes of another type. In this illustrative embodiment, communications may be kept separate through the use of separate ports on a machine, or any other known technique. For example, a machine identified by IP address 1.2.3.5 may have a terrain node accessible at 1.2.3.5:50000, while a diagnostic node on the same machine may be accessible at 1.2.3.5:50001.

Each node may include parameter definitions that vary from node to node, e.g., indicating the node's type, terrain size and definition (when applicable), types of agents allowed, number of independent agents that can execute simultaneously, and the like. Because each independent agent may originate from any source, including potentially untrusted authors, each node also provides security so that independent agents cannot perform malicious acts on the node's local computer system. The security parameters and controls may be stored in a security module that executes in or as part of the node module. In one illustrative embodiment, each node is executed in a managed code environment, such as Common Language Runtime (CLR) and the .NET framework, or Java Virtual Machine. Any managed code environment providing similar security mechanisms may alternatively be used.

Running each node in a managed code environment allows each node to use the environment's security policy measures to sandbox independent agents (i.e., restrict independent agents from performing malicious acts on the computer system). That is, each node can define a security policy in such a manner so as to allow independent agents to perform only non-malicious acts when executing on the local computer system, based on a predefined security policy manager provided by the managed code environment. The security policy may be defined on a per-agent basis (i.e., each independent agent may have a differing security policy), may be defined on a group basis (i.e., each agent belonging to a specified group has the same security policy), or may be defined globally (i.e., all independent agents have the same security policy). Using the various security policy definition levels, a node can provide one or more security policies to one or more independent agents, including independent agents unknown at the time the security policy is defined.

With reference back to FIG. 2, each node 201, 211, 221, 231, 241 includes a discovery module 203, 213, 223, 233, 243, respectively. The discovery module can detect other nodes that are a part of the unbounded computing space, and may also maintain a list of other nodes that are available to receive an independent agent.

In one illustrative embodiment, each discovery module may communicate with a central server 253 that maintains a list of active nodes in the unbounded computing space 200. Each new node, upon initialization, may register with the server 253 and obtain a list of active nodes within the unbounded computing space 200. Each node may subsequently receive an updated list of active nodes in predetermined intervals (e.g., every 2 minutes, 5 minutes, 15 minutes, etc.).

In another illustrative embodiment, no central server is used. Instead, a peer-to-peer detection scheme may be used to discover other nodes. In this embodiment, a node 201 may broadcast an undirected discovery request over the network 251, e.g., by sending a network broadcast specifying a specific HTTP port without specifying a specific recipient, as is generally known in the art. When another node, e.g., node 211, receives the broadcast, it sends a response to the broadcasting node 201 indicating its presence in the unbounded computing space. Once the broadcasting node 201 receives the response, it can determine the network address of the other node 211, and can communicate with node 211 to learn about still other nodes of which node 211 is aware, e.g., nodes 221, 231, and/or 241. This process can be repeated until node 201 is either aware of every node in the UCS 200, or is aware of at least a predetermined number or percentage of nodes in the UCS 200, as defined by the detection module.

Each node also includes an interaction module that coordinates communication and independent agent transmissions among nodes. The interaction module defines the common way in which each node communicates with other nodes by defining an information passing protocol that is used throughout the unbounded computing space, as well as an agent passing protocol that is used to transfer independent agents from one node to another. In an alternative embodiment, information and agent passing may be performed by a single protocol.

The information passing protocol is used to pass environment information from one node to another. Environment information may include information such as runtime version, knowledge of certain types of independent agents, and the like. Knowledge of a certain independent agent may be useful because if node 201 is already storing a copy of a specific independent agent, e.g., the SpaceMaker independent agent, then there is no need for another node 211 to duplicatively send another copy. Instead, when node 211 informs node 201 that node 211 is going to send the SpaceMaker independent agent, node 201 indicates to node 211 that node 201 is already aware of the SpaceMaker independent agent, authenticates the preexisting copy of the SpaceMaker independent agent, and executes the preexisting copy of the SpaceMaker independent agent when authenticated successfully.

In one illustrative embodiment of the invention, the interaction module uses a hypertext transport protocol (HTTP) server to perform information and agent passing among nodes via extensible markup language (XML) messages. The interaction module may use the HTTP POST feature to upload an independent agent from one node to another, e.g., by using a specific port identifier. One of skill in the art will appreciate that other communications protocols may be used for node communications and independent agent transmissions. For example, an interaction module may alternatively use a TCP (Transmission Control Protocol) connection between peers in combination with the serialization mechanism provided in Common Language Runtime (CLR) to exchange information between nodes. In yet another embodiment an independent agent may be stored on a removable disk (e.g., a floppy disk), which is transported to another computer system acting as a node, and the independent agent is loaded from the removable disk. Any other protocol that provides a standard way to exchange information and code can alternatively be used. Preferably, the selected protocol should understand and account for evolving nodes. That is, the protocol should (but is not required to) communicate with older nodes that do not necessarily include all the functions of the latest node software.

Figure 4:
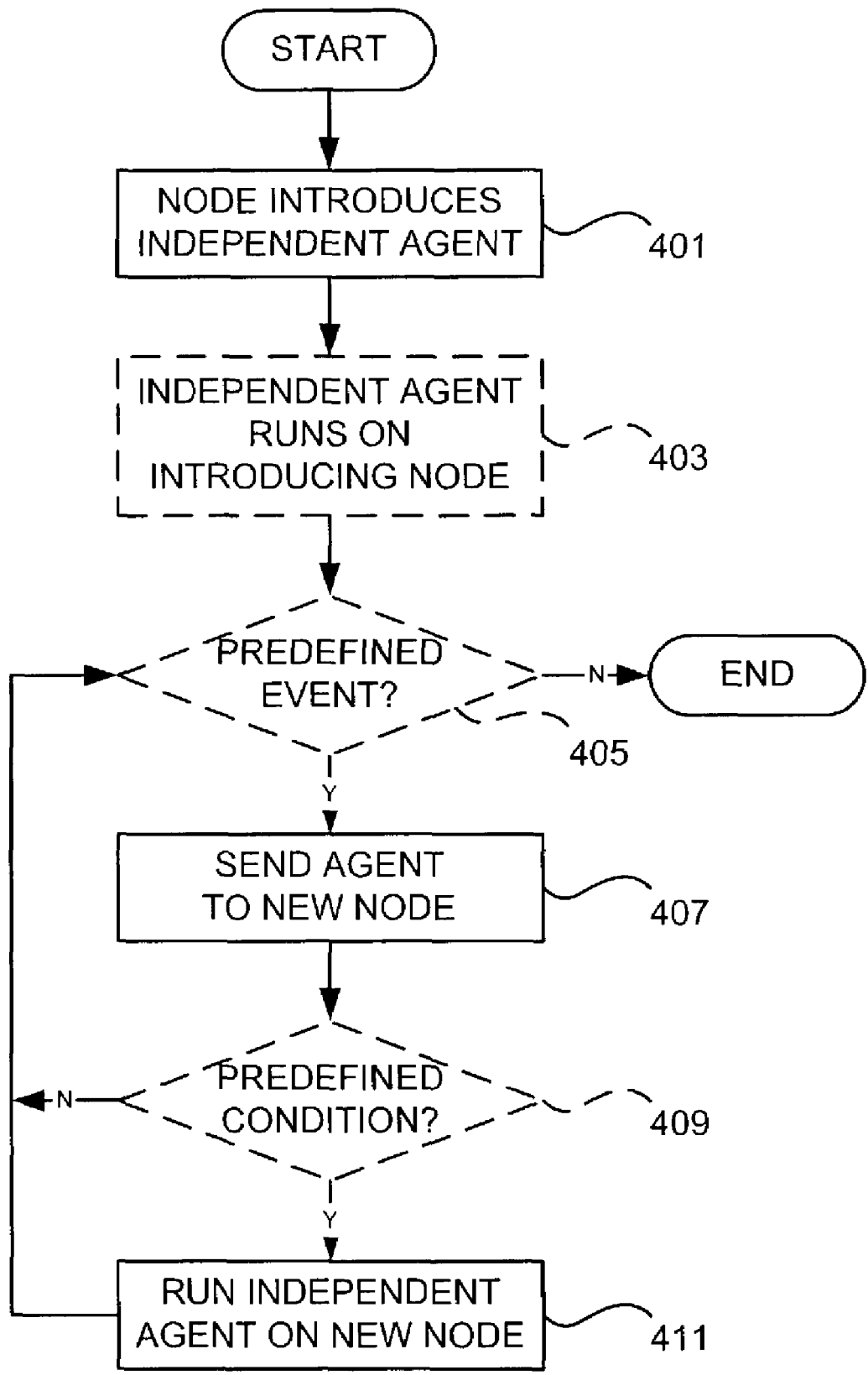
FIG. 4 illustrates a method for executing an independent agent in an unbounded computing space according to an illustrative embodiment of the invention.

With reference to FIG. 4, using the above-described unbounded computing space, any node can introduce an independent agent that can potentially run on any other node within the unbounded computing space. In step 401, an introducing node, e.g., node 201 in FIG. 2, introduces an independent agent. Node 201 may introduce the independent agent by loading the independent agent within the execution environment defined by node 201. Optionally, in step 403, node 201 executes the introduced independent agent. In step 405, also optional, node 201 may wait for a predefined event to occur, prior to sending or copying the independent agent to a new node in step 407. If the predefined event never occurs, the independent agent might not be transferred to another new node. The predefined event may be the occurrence of any event or the satisfaction of any condition as defined by a user or program. For example, the predefined event may be as simple as the satisfaction of the condition that there is another node in the computing space in which the independent agent has not yet been run, and the present node may send the independent agent to that node in step 407. That is, the independent agent may store historical data regarding nodes which the agent has visited and/or which have executed the agent. The present node may compare the historical data to the present node's list of other nodes of which it is aware, and the present node may send the independent agent to a node of which it is aware that the agent has not yet visited and/or on which the agent has been executed.

As another example, the predefined event may be the occurrence of an event, such as a local process independently determining that the independent agent should be sent to a new node, e.g., independent agent 307 "hitting" a plant or animal independent agent as illustrated above. Alternatively, node 201 may send the independent agent to a new node in step 407 without waiting for a predefined event, or may select a node at random to which the independent agent is sent.

In step 407, node 201 sends a copy of the independent agent to a new node, e.g., node 211. Node 201 may or may not delete its local copy of the independent agent. Node 201 may or may not include the independent agent's state information when sending to node 211, depending on the design and purpose of the independent agent. If the agent is being "teleported" from one node to another, state information may be included. However, if the agent is performing diagnostic services, state information might not be included so that the independent agent can start from a newly initialized state on each node.

Alternatively, some state information may be copied from one node to another in order to track and keep a historical record of the activities of the independent agent (e.g., number of nodes on which it has executed, age since creation, average fragmentation of hard drives, and other statistical and descriptive information).

In step 409, the node receiving the independent agent optionally checks for the presence of or waits for a predefined condition to occur in step 409 prior to running the independent agent in step 411. The predefined condition may include any user or program defined condition, such as hard drive fragmentation above a certain threshold, available hard drive space below a certain threshold, and the like. The predetermined condition may be provided by either the agent itself or the node to which it was sent. After running the independent agent in step 411, the present node (node 211) may return to step 405 and wait or check for the predefined event associated with that independent agent (or a different predefined event), or may skip step 405 and continue immediately to step 407 and send the independent agent to yet another node (e.g., back to node 201, or to a new node 221, 231, 241).

While the invention has been primarily described as an unbounded computer space, in an alternative illustrative embodiment a grid computing architecture can be modified to allow any person (or machine), even an untrusted person (or machine), to introduce programs into the computing space. Each node in the grid computing architecture can use CLR code access security, or any similar security model, to safely execute software, including software submitted by an untrusted party.

Using any of the above-described models, e.g., the unbounded computing space or modified grid computing architecture, work can be performed in a distributed manner without using a central server to coordinate each task. For example, when a user or program determines that a primary task could be performed more quickly if the primary task were distributed among multiple computers, the user (or program) may create an independent agent that, when introduced at a node, coordinates the performance of the task across one or more systems in the entire computing space (e.g., by sending independent agents containing sub-tasks to other nodes). That is, the unbounded computing space acts as a "supercomputer" by treating each node in the unbounded computing space as a processor, and allowing users to submit programs that can run independent but coordinated tasks on several of the nodes. Any user (even untrusted users) can submit programs for execution on the supercomputer, e.g., programs that get more accurate or more detailed with more processors. For example, a user may submit an independent agent that models traffic, and each node computer behaves like an automobile. Adding more nodes to the unbounded computing space allows the agent to model a larger road as a result of having more "cars" to work with.

In an illustrative embodiment, a primary independent agent introduced in a coordinating node may generate derivative independent agents that, when sent to other nodes, each performs a sub-task of the primary task, or each equally interact to accomplish a joint task. The original independent agent or the derivative independent agents may be programmed to check for predetermined criteria prior to sending one of the derivative independent agents to another node. For example, an agent may check to determine that the other node's processor utilization level is below a predetermined threshold to ensure that the derivative agent will not interfere with other programs executing on the other node, or an agent may check to verify that the other node has a specific resource that is required in order to complete the sub-task. Thus, any node in the unbounded computing space (or modified grid computing architecture) can dynamically act as a coordinator for a given task performed or distributed across the system, without requiring that the coordinating node has any special central authority or privileges, because each node in the system ensures that agent programs do not perform malicious behavior as defined by each node's security policy. Each node that performs the task (or a portion of the task) may send results back to the coordinating node, as specified by the derivative independent agent(s) sent to the other nodes.

Depending on the use of the unbounded computing space, some agent behaviors may be undesirable even though the behavior satisfies the security system (i.e. the action it performs is allowed by the current security policy). For example, the security system might allow agents to communicate or share information with each other through otherwise benign operations, e.g., to accomplish a joint task. However, when the unbounded computing space embodies a game in which independent creatures (agents) co-exist and compete for virtual "resources" such as plants and food, it may be undesirable to allow independent agents to communicate with each other except through well-defined interfaces provided as part of the system. If independent agents communicated with each other, a player could program an agent to coordinate with other similarly programmed agents (or other instances of the same agent) to overcome an adversary and gain an unfair advantage in the game. In addition, the security system might not protect or enforce limits on the use of system resources. That is, CPU time, memory, shared objects, thread state, and the like might not be protected by the security system, resulting in the possibility that an independent agent or agents could exploit a system resource to maliciously affect the computer system hosting the node. For example, an independent agent might spawn unlimited threads, causing the system to "freeze up" or otherwise crash.

Thus, to prevent undesirable behaviors that might otherwise be allowed by the security system of each node, and to ensure that each independent agent receives equal (or otherwise fairly distributed) resources while executing in the node, each node may include an agent assembly inspection module. Use of an assembly inspection module allows the unbounded computing space to provide a level of certainty about robustness, reliability and responsiveness of independent agents by ensuring that agents that contribute adversely to these goals or that exhibit known undesirable behavior can be identified and eliminated. This is useful is any peer-to-peer environment, but is especially useful in games and simulations because the assembly inspection module ensures that each instance of the same agent is isolated from other instances of the same object except through the use of pre-defined APIs defined by the hosting node. The assembly inspection module may also be used in any type of system where untrusted users are submitting executable code into the system and the owner/operator of the system needs to ensure that certain behaviors otherwise allowed by a general purpose programming framework are not allowed within the system.

Figure 5:
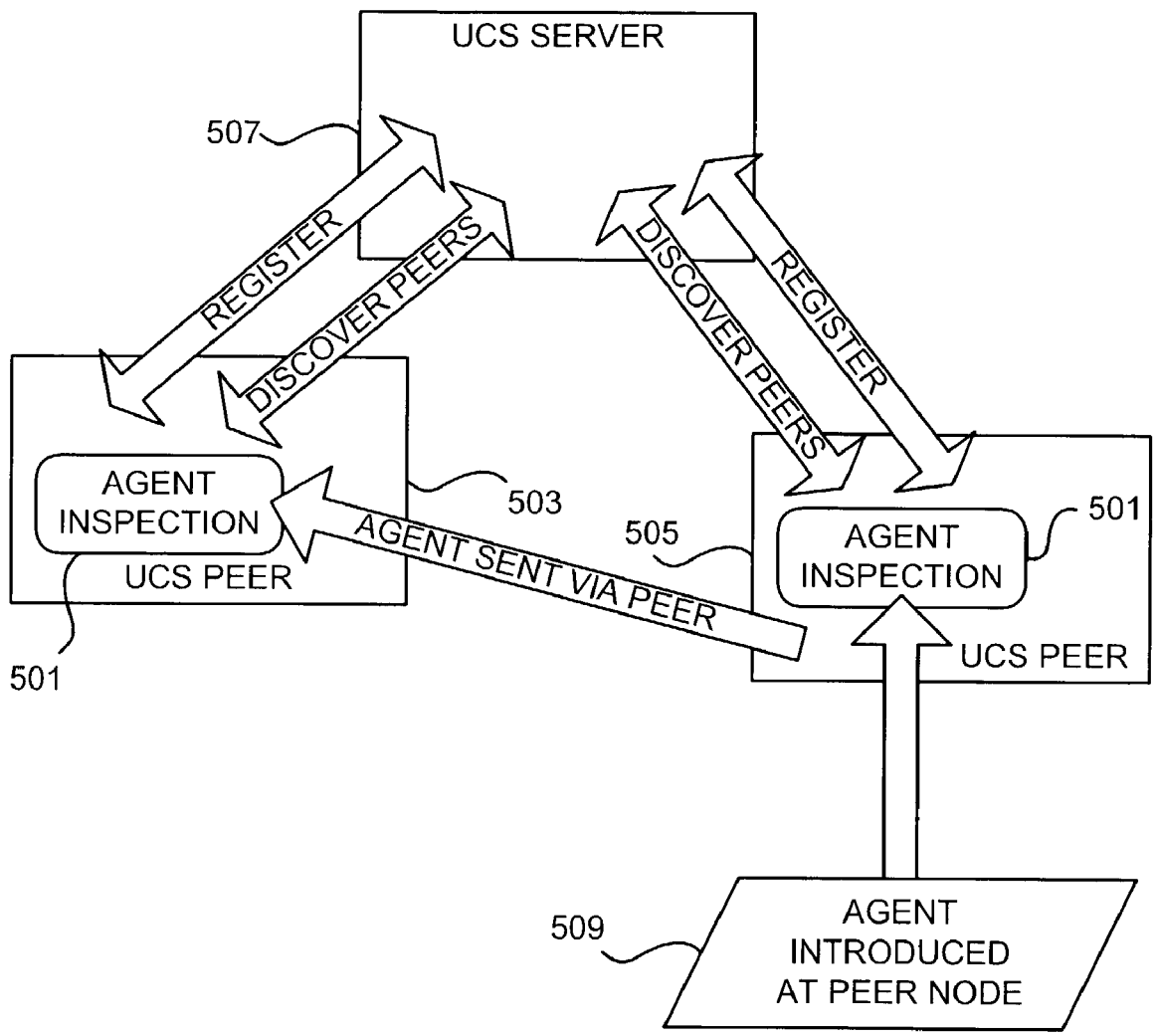
FIG. 5 illustrates a block diagram of a computer network that performs peer assembly inspection according to an illustrative embodiment of the invention.

FIG. 5 illustrates a block diagram of an unbounded computing space including two peer nodes 503 and 505, and a server 507. Each node 503, 505 includes an agent assembly inspection module 501. Each agent assembly inspection module 501 examines an agent assembly as it is received at a node to ensure that the agent abides by predefined rules stored in the assembly inspection module 501. That is, the assembly inspection module 501 inspects agents subsequent to compilation, but prior to execution. Because both the security system and the inspection module 501 may prohibit self-modifying code, if the agent is permitted to run there is a guarantee that the agent will run as examined. In one illustrative embodiment of the invention, the inspection module 501 is separate from and provided as an additional safeguard to the security system, described above. That is, the inspection module examines executable code as it is received by before it is executed, whereas the security system prevents undesired behaviors during execution. However, one of skill in the art could envision an embodiment wherein the security module includes the assembly inspection module 501 and performs both functions, i.e., the security module scans executable code for security issues as it is received prior to execution, and the security module also prevents executing code from performing undesired behaviors. If a developer unwittingly introduces an agent that executes conditionally and infrequently, the developer might unknowingly ship an agent with an undesired security behavior. Thus, static inspection and enforcement may catch the undesired behavior before it is otherwise discovered by others.

It will be appreciated by one of skill in the art that rules stored in inspection modules might not be uniform across nodes. That is, rules stored in the inspection module 501 of a first node 503 might differ from rules stored in the inspection module 501 of a second node 505. Alternatively, the rules may be uniform across all nodes in an unbounded computing space.

Figure 6:
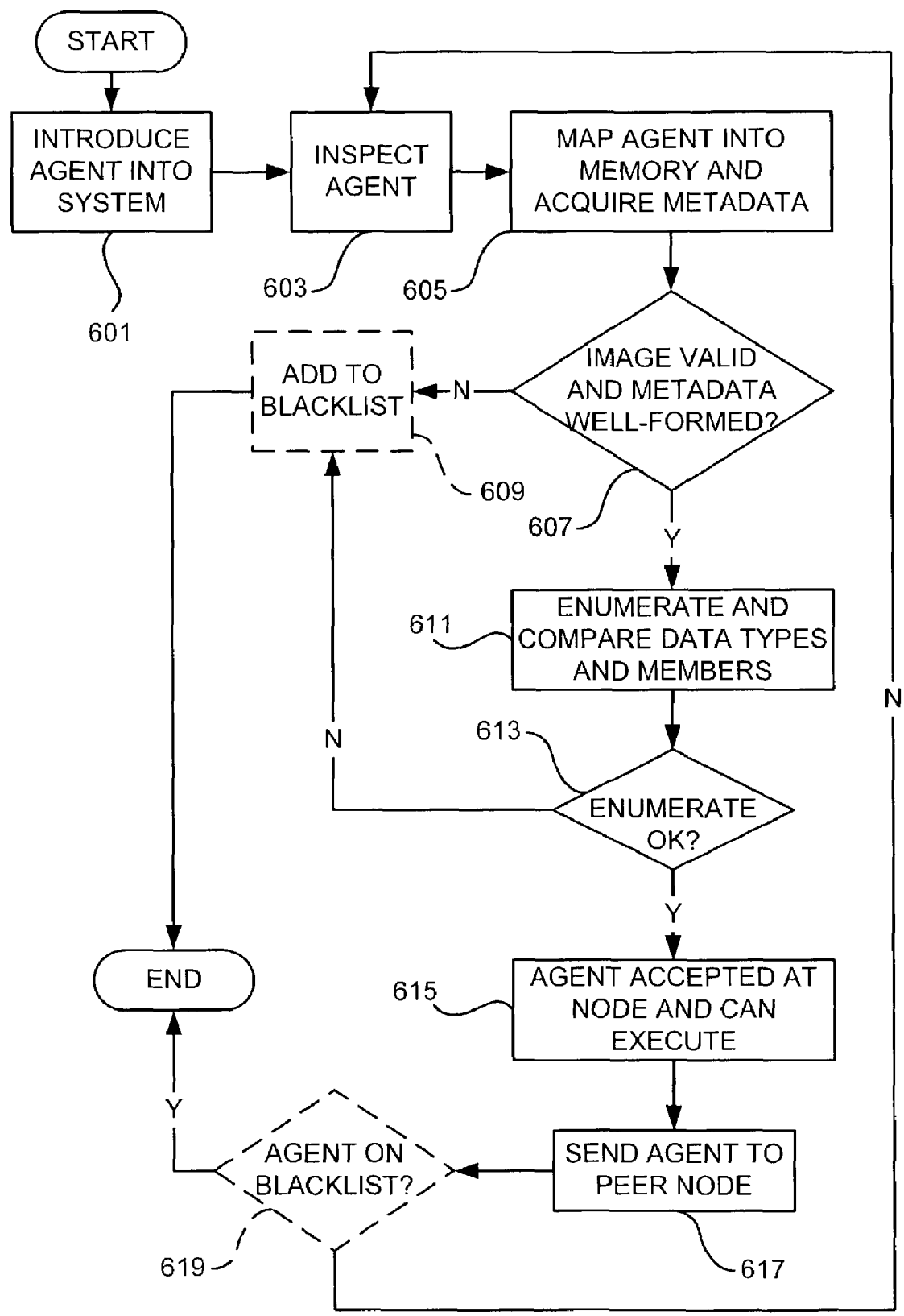
FIG. 6 illustrates a method for performing peer assembly inspection according to an illustrative embodiment of the invention.

FIG. 6 illustrates an illustrative method for performing agent assembly inspection as agents are introduced into the system and as agents are sent from one node to another. The inspection process provides for a one-time scan of an agent when it is first introduced in a given node within an unbounded computing space. If the scan is successful, the agent can load and run without further runtime costs. If the scan reveals that the agent may or will exhibit undesirable behavior, the name of the agent is added to a blacklist database and prevented from running. Subsequent attempts to reload any agent with the same name will quickly fail based on the name. Only by changing the name of an agent can an agent receive another opportunity to execute in a node, and then only after successfully completing the inspection process as described below.

The blacklist database represents a list of code assemblies that are known to interact in an undesired manner with the computer system based on the criteria defined by the inspection module. In one illustrative embodiment, agents are identified by both a digital signature (e.g., a strong name) and a name of the code unit (e.g., the name of the DLL). In alternative illustrative embodiments, only the strong name may be used, only the name of the code unit may be used, or some other identifying element (or combination of elements) may be used.

In step 601, an agent is introduced (loaded) into an unbounded computing space at a node. In step 603, the inspection module 501 performs an initial inspection of the agent. The inspection may be performed using application program interfaces (APIs, aka subroutines) provided by the system to inspect metadata, code constructs, and types used in the agent. In one illustrative embodiment, the inspection module uses unmanaged component object model (COM) interfaces to interact with a CLR metadata facility. In another illustrative embodiment, java or C++ may provide the metadata facilities. The agent is mapped into memory in step 605 without giving the agent the opportunity to run or be loaded as an executable unit of code. Once the agent is mapped into memory, the inspection module 501 in step 607 determines whether the mapped image is valid and whether the metadata is well formed using built in APIs of CLR that validate a piece of code as being well formed (i.e., valid).

The CLR APIs provide a set of verification rules regarding what can and can not be done in an agent to ensure that each agent can be understood to a particular level, specifically, a level in which external code can legitimately follow the execution path of the agent. This is known as verification by CLR. CLR code is typically provided in a portable executable (PE) image format. Each PE file is a well-defined executable image format used by various platforms (e.g., for creating EXE and DLL files), and has directories that refer to code sections, etc. Verification refers to confirming that each PE file is well-formed and in accordance with the normal rules of the PE format.

If this initial inspection fails, then the name of the agent is added to a database representing a blacklist in step 609. If the agent successfully passes the initial inspection in step 607, then the inspection module uses CLR's known metadata interfaces to enumerate each managed type in the system. CLR provides rules governing how metadata is constructed and compressed, such as whether or not it maintains referential integrity, etc. For each enumerated type, the inspection module enumerates each member of each type and all the executable members (e.g., methods) are subsequently examined in step 613.

Enumeration, generally, refers to determining which types (or classes, e.g., month, file, integer, window, etc.) are used anywhere in an agent, and comparing the types against a set of known dangerous types. For example, a system might not allow agents to manipulate the thread class because doing so can often cause undesirable results. Thus, if an agent refers to the thread class, the inspection module may determine that the agent may potentially perform an undesired behavior, and prevent it from running. During enumeration, the inspection module concentrates on the types being used; the actual values of each type are generally not important. Enumeration provides a guarantee that all types used by an agent are examined because the agent has already been verified, as described above (i.e., the agent has been examined to ensure that it is transparent and is not able to hide any types that it is using).

The inspection process includes converting the relative virtual address (RVA) of the method to a virtual address. RVA conversion refers to taking the relative address of a method as defined in the agent and turning it into a physical address after the loader performs any relocations in memory. For example, the linker might determine that an agent gets loaded at offset 0x1000000 and that the method exists at 1x1000200. When the agent is loaded, there may be a conflict at 0x1000000, so the agent is relocated to 0x1100000. The RVA of the method is 0x1000200, but the virtual address is 0x1100200. The inspection module determines the RVA to find where the agent is mapped into memory when the inspection module examines it. In one illustrative embodiment, agents are mapped into memory without giving the loader a chance to load them (i.e., so the system does not run the agent). In such an embodiment, the inspection module may adjust the RVA to the correct virtual address based on where the image is mapped into memory.

After determining the RVA, the method header may then be decoded to obtain a pointer to the actual location of the instructions in the method. The inspection module 501 continues the inspection by examining each instruction in the method and comparing it to a list of known instructions, specific to the implementation of the unbounded computing space, which may cause undesirable behavior. For example, in a UCS used for a game as described above, the game might not want to allow agents to communicate with each other, regardless of whether the agents are multiple instances of the same agent or two unrelated agents. Thus, the inspection module 501 may search for instances of operation codes (opcodes) that can be used to store data into a static field that is shared across instances or agents, e.g., the stfld opcode with a static field as the target. If any of the banned opcodes are found, the inspection fails and the name of the agent is added to the blacklist.

In addition to scanning opcodes, the inspection module 501 may also check each call made by the agent. The inspection module 501 verifies the type of the called code against a list of known types that might contain behaviors that are undesirable to the unbounded computing space. That is, the inspection module checks possible uses of calls including derivation and containment. For example, a derived class might not explicitly call a constructor, but by virtue of inheritance it may call the constructor anyway, so the inspection module checks for this loophole. In another example, agents in the game UCS described above might not be allowed to use synchronization objects that could be used to block game threads and/or inhibit game play. As another example, an unbounded computing space may allow agents, for development and debugging purposes, to report or trace their behavior and state. It might be undesirable, however, to allow the agents to display user interface (UI) or message boxes for reporting purposes that might otherwise block the main game thread. Thus, the inspection module 501 may include a rule that blacklists agents that attempt to call a UI or message box generating method.

The inspection module may also examine each agent to ensure that the agent does not create timers or threads, and does not interact with timers or threads in order to gain an unfair advantage within the game, as defined by the game rules. For example, if an agent could create a new thread that was not monitored by the game engine (i.e., the hosting node), the agent could perform lengthy calculations that it is otherwise incapable of performing within its allotted quantum during game play, and gain an unfair advantage over other agents.

In one illustrative embodiment, the inspection module 501 includes rules that ban types including classes that implement reflection (i.e., the inspection of runtime metadata), file access, cryptography, console access, UI, stack frame and stack tracing, debugging, thread local storage, synchronization objects, timers, thread pools, and threads. In addition each type used by an agent may be examined to ensure that it does not derive from a banned type. If a banned type or a derivative of a banned type is found, the inspection module adds the name of the agent to the blacklist.

In one or more illustrative embodiments, certain class constructors might be allowed only when they are determined to be safe. That is, by default, no constructors may be allowed. Only after the inspection module determines that a constructor does not present a risk to game play is it allowed. For example, the inspection module may include a rule indicating that constructors that initiate exceptions during initialization are not allowed. Each constructor may be scanned to ensure that it is an empty method or a method containing only a return instruction. Because some known compilers produce such constructs, the inspection module, in one illustrative embodiment, may be able to differentiate between a known block of instructions that can do no harm (empty code or code with a return instruction) and unsafe code (everything else). In some embodiments, the inspection module also contains rules enforcing appropriate type visibility. For example, required type interfaces might not be allowed to be private.

During the inspection process, the inspection module may log data to a file to indicate errors for subsequent human review. Each error may be associated with a human readable statement describing the cause of the failure and the type (class) and method in which it occurred. Agent developers can review the log file to aid in the debugging process.

In step 613, if the agent does not successfully satisfy the rules as defined by the inspection module 501, the node adds the name of the agent to the blacklist in step 609, and may ignore the agent or delete the agent from the system. If the agent successfully satisfies the rules as defined by the inspection module 501, the node accepts the agent in step 615, and can at any subsequent time execute the agent in that node. At some time later, in step 617, the node may send the inspected agent to a peer node. The peer node, in step 619, checks to determine whether the name of the agent is present in the blacklist maintained by the peer node. If so, execution stops and the agent may be deleted. If not, the peer node performs the same inspection process using the rules of its inspection module, returning to step 603.

As is illustrated in FIG. 6, the use of a blacklist database may be optional. That is, when maintaining the blacklist is more expensive for a given system than performing the assembly scan, the assembly scan may be done on each iteration. This might be true for a very large system which only allows very small agents to be introduced. One of skill in the art can envision other systems that perform in a similar manner.

One of skill in the art can envision an embodiment that allows a node to maintain a "safe" list of agents in addition to the blacklist. However, in such an embodiment there is a risk of a malicious agent mimicking the name of a safe agent in order to perform malicious or undesired behavior on the node. In such an embodiment CLR strong names, digital signature technologies, or any other known authentication mechanism can be used to verify an agent to prevent such a scenario.

One of skill in the art that the above-described invention, while having been described with respect to a peer-to-peer unbounded computing space, applies equally to any system that loads and potentially executes code of unknown or untrusted origin, and that needs to guarantee its safety with respect to dangerous operations before the code is run. For example, in addition to unbounded computing spaces and distributed computing architectures (e.g., grid computing), the disclosed systems and techniques may also be used by an Internet service provider (ISP) that hosts executable code for users (i.e., companies that host code in exchange for payment). The ISP typically will want to accept code from any source, while ensuring that the code does not perform undesired behaviors (e.g., attack a computer system, use excessive resources, etc.), and may use one or more aspects of the invention as described above.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method for preventing undesirable behavior by an executable code module received from a potentially untrusted source, the executable code module including one or more independent agents, the executable code module being inspected with an assembler utility to ensure that each of the one or more independent agents receives equal resource treatment during execution within a particular node module, the method comprising:

(i) querying a database to ensure that each independent agent receives equal resource treatment during execution within a particular node module for identifying information corresponding to an executable code module received at a host system;

(ii) when step (i) returns a predetermined result, scanning the code module concerning each independent agent, with the assembler utility for an indication that the code module has a potential to cause undesired behavior in the receiving host when executed, wherein said scanning comprises:

(a) for each type in the code module that is a managed type, enumerating each managed type, (b) for each managed type enumerated in step (a) that contains a member, enumerating each member, and (c) comparing the value of each enumerated managed type and enumerated member to a list of predetermined values and determining the value of at least one of the enumerated managed types and the enumerated member list for the each independent agent as not defined by the assembler utility; and (iii) when step (ii) finds the indication the code module has the potential to cause undesired behavior in the receiving host when executed, preventing execution of the code module at the receiving host, and otherwise the assembler utility loading executable code for common privilege settings for a set of Application Program Interfaces into the each executable code module.

2. The method of claim 1, wherein in step (ii) the predetermined result comprises not finding the identifying information in the database.

3. The method of claim 1, further comprising the step of preventing execution of the code module when step (i) finds in the database the identifying information corresponding to the code module.

4. The method of claim 1, further comprising the step of adding the identifying information to the database when step (ii) finds the indication the code module has the potential to cause undesired behavior in the receiving host when executed.

5. The method of claim 1, wherein in step (ii) the indication comprises a predetermined computer instruction.

6. The method of claim 1, wherein in step (ii) the indication comprises an instruction that initiates use of a system resource.

7. The method of claim 6, wherein the system resource comprises a CPU.

8. The method of claim 6, wherein the system resource comprises spawning a system thread.

9. The method of claim 6, wherein the system resource comprises memory.

10. The method of claim 6, wherein the system resource comprises a user interface.

11. The method of claim 1, wherein the database comprises a blacklist database.

12. The method of claim 1, wherein the identifying information corresponding to the code module comprises a name of a file.

13. The method of claim 1, wherein the identifying information corresponding to the code module comprises a Common Language Runtime strong name.

14. The method of claim 1, wherein step (ii) comprises scanning the code module for any instruction of a plurality of instructions that have the potential to cause undesired behavior in the receiving host when executed, and further comprising:

(iv) executing the code module when step (iii) does not find any of the plurality of instructions.

15. The method of claim 1, wherein step (ii) comprises:
(a) mapping the code module to a memory;
(b) determining whether a mapped image is valid; and
(c) determining whether code module metadata is well-formed.

16. The method of claim 1, wherein the indication comprises a predetermined managed type.

17. The method of claim 1, wherein the indication comprises a derivative of a predetermined managed type.

18. The method of claim 1, wherein the indication comprises a predetermined constructor.

19. The method of claim 1, wherein the indication comprises a type visibility.

20. A computer system that prevents an executable code module from performing an undesired behavior when executed, comprising:

a processor;

system memory;

a database storing identifying information corresponding to executable code modules that performs undesired behavior when executed on the computer system;

an assembly inspection module that scans executable code modules received from peer computer systems to determine whether each executable code module has a potential to perform an undesired behavior when executed on the computer system, and wherein for each type used in the received code module that is a managed type the assembly inspection module enumerates each managed type, and wherein for any enumerated managed type used by a received code module containing a member, enumerates each member of each such enumerated managed type;

the system memory storing computer readable instructions that, when executed by the processor, cause the computer system to perform steps comprising:

(i) querying the database for identifying information corresponding to the received executable code module;

(ii) when step (i) returns a predetermined result, causing the assembly inspection module to scan the received executable code module; and (iii) preventing execution of the received executable code module when the assembly inspection module determines that the received executable code module has the potential to perform an undesired behavior when executed on the computer system.

21. The system of claim 20, wherein the computer readable instructions, when executed by the processor, further cause the computer system to perform the step of preventing the received executable code module from executing when the identifying information corresponding to the received executable code module is found in the database in step (i).

22. The system of claim 20, wherein in step (ii) the predetermined result comprises not finding the identifying information in the database.

23. The system of claim 20, wherein the computer readable instructions, when executed by the processor, further cause the computer system to perform the step of adding the identifying information to the database when the assembly inspection module determines that the received executable code module has the potential to perform an undesired behavior when executed on the computer system.

24. The computer system of claim 20, wherein the assembly inspection module scans the received executable code module for a predetermined computer executable instruction.

25. The computer system of claim 20, wherein the identifying information corresponding to the received executable code module comprises a name of the received executable code module.

26. The computer system of claim 20, wherein the assembly inspection module scans the received executable code module for any computer executable instruction of a plurality of instructions that have the potential to cause undesired behavior in the computer system when executed, and wherein the computer readable instructions further cause the computer system to perform the step of executing the received executable code module when the assembly inspection module does not find any of the plurality of instructions.

27. The computer system of claim 20, wherein the assembly inspection module scans for a predetermined managed type.

28. The computer system of claim 20, wherein the assembly inspection module scans for any derivative of a predetermined managed type.

29. A computer architecture, comprising:
  a plurality of peer computer systems, each peer comprising an execution shell for running executable code modules, said each execution shell comprising:
    a discovery module that detects other peer computing systems;
    an interaction module for communicating with other execution shells of other detected peer computing systems; and
    an assembly inspection module comprising:
      a database of blacklisted agent programs; and
      computer readable instructions that, when executed by a processor of each of the peer computer systems, cause the peer computer systems to perform steps comprising:
        (i) querying the database for identifying information corresponding to a received executable code module;
        (ii) preventing the received executable code module from executing when the identifying information corresponding to the received executable code module is found in the database;
        (iii) scanning the received executable code module when the identifying information corresponding to the received executable code module is not found in the database, wherein said scanning comprises:
          (a) for each type in the code module that is a managed type enumerating each such managed type;
          (b) for each managed type enumerated in step (a) that contains a member enumerating each member; and
          (c) comparing the value of each enumerated managed type and enumerated member to a list of predetermined values; and
        (iv) adding the identifying information corresponding to the received executable code module when the assembly inspection module determines that the received executable code module has the potential to perform an undesired behavior when executed on the peer computer system.

30. A computer storage media for use at computer system, the computer storage media for implementing a method for preventing undesirable behavior by an executable code module received from a potentially untrusted source, the executable code module including one or more independent agents, the executable code module being inspected to ensure that each of the one or more independent agents receives equal resource treatment during execution within a particular node module, the computer storage media having stored thereon computer-executable instructions that, when executed at a processor, cause the computer system to perform the method, including the following:
  querying a database to ensure that each independent agent receives equal resource treatment during execution within a particular node module for identifying information corresponding to an executable code module received at a host system;
  when the query of the database returns a predetermined result, scanning the code module concerning each independent agent for an indication of the code module implementing undesired behavior in the receiving host when executed, scanning the code module including:
    enumerating each type in the code module to identify managed types included in the code module;
    enumerating the identified managed types to identify each managed type that contains a member;
    comparing the value of each identified managed type and identified members to a list of predetermined values;
    from the comparisons, determining the value of at least one of the enumerated managed types and the enumerated member list for the each independent agent as not defined by the assembler utility; and
  when scanning the code module concerning each independent agent finds an indication of the code module implementing undesired behavior, preventing execution of the code module at the receiving host, and otherwise the assembler utility loading.

31. The computer storage media of claim 30, wherein the indication comprises an instruction that initiates use of a system resource.

32. The computer storage media of claim 31, wherein the system resource comprises a CPU.

33. The computer storage media of claim 31, wherein the system resource comprises spawning a system thread.

34. The computer storage media of claim 31, wherein the system resource comprises memory.

35. The computer storage media of claim 31, wherein the system resource comprises a user interface.

36. The computer storage media of claim 30, wherein the indication comprises a predetermined managed type.

37. The computer storage media of claim 30, wherein the indication comprises a derivative of a predetermined managed type.

38. The computer storage media of claim 30, wherein the indication comprises a type visibility.

* * * * *